(12) United States Patent
Kobayashi

(10) Patent No.: US 12,058,456 B2
(45) Date of Patent: Aug. 6, 2024

(54) SOLID-STATE IMAGING DEVICE

(71) Applicant: CANON KABUSHIKI KAISHA, Tokyo (JP)

(72) Inventor: Hideo Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/939,225

(22) Filed: Sep. 7, 2022

(65) Prior Publication Data

US 2023/0072715 A1    Mar. 9, 2023

(30) Foreign Application Priority Data

Sep. 8, 2021 (JP) ................. 2021-146388

(51) Int. Cl.
| | | |
|---|---|---|
| *H04N 25/677* | (2023.01) | |
| *H04N 23/84* | (2023.01) | |
| *H04N 25/10* | (2023.01) | |
| *H04N 25/71* | (2023.01) | |
| *H04N 25/77* | (2023.01) | |
| *H04N 25/78* | (2023.01) | |
| *H04N 25/79* | (2023.01) | |

(52) U.S. Cl.
CPC ......... *H04N 25/677* (2023.01); *H04N 25/745* (2023.01); *H04N 25/77* (2023.01); *H04N 25/79* (2023.01); *H04N 23/84* (2023.01)

(58) Field of Classification Search
CPC .... H04N 25/677; H04N 25/745; H04N 25/79; H04N 25/77; H04N 23/84; H04N 25/10; H04N 25/78
See application file for complete search history.

(56) References Cited

U.S. PATENT DOCUMENTS

| | | |
|---|---|---|
| 7,990,440 B2 | 8/2011 | Kobayashi et al. |
| 8,259,206 B1 | 9/2012 | Shibata et al. |
| 8,289,432 B2 | 10/2012 | Shibata et al. |
| 8,710,558 B2 | 4/2014 | Inoue et al. |
| 8,835,828 B2 | 9/2014 | Kobayashi |

(Continued)

FOREIGN PATENT DOCUMENTS

| | | |
|---|---|---|
| JP | 2010-109893 A | 5/2010 |
| JP | 2010-268080 A | 11/2010 |

(Continued)

OTHER PUBLICATIONS

Office Action dated Jul. 25, 2023, in Japanese Patent Application No. 2021-146388.

*Primary Examiner* — Marly S Camargo
(74) *Attorney, Agent, or Firm* — Venable LLP

(57) ABSTRACT

A solid-state imaging device comprising: a pixel array including pixels arranged in a plurality of rows and in a plurality of columns; a first column circuit group; a second column circuit group disposed in the same side with respect to the pixel array as that in which the first column circuit group is disposed; a first counter configured to supply a count signal to the first column circuit group; and a second counter configured to supply a count signal to the second column circuit group, wherein the first column circuit group and the second column circuit group are arranged to be separate from each other in a direction along the columns, wherein the first column circuit group and the second column circuit group are configured to process pixel signals for different colors.

20 Claims, 10 Drawing Sheets

(56) References Cited

U.S. PATENT DOCUMENTS

| | | | |
|---|---|---|---|
| 8,884,391 B2 | 11/2014 | Fudaba et al. | |
| 9,264,641 B2 | 2/2016 | Kobayashi | |
| 9,305,954 B2 | 4/2016 | Kato et al. | |
| 9,357,122 B2 | 5/2016 | Kususaki et al. | |
| 9,357,147 B2 | 5/2016 | Nishida et al. | |
| 9,407,847 B2 | 8/2016 | Maehashi et al. | |
| 9,438,828 B2 | 9/2016 | Itano et al. | |
| 9,509,931 B2 | 11/2016 | Kobayashi et al. | |
| 9,602,752 B2 | 3/2017 | Kobayashi et al. | |
| 10,015,430 B2 | 7/2018 | Kobayashi et al. | |
| 10,334,195 B2 | 6/2019 | Saeki et al. | |
| 10,609,316 B2 | 3/2020 | Kobayashi | |
| 10,659,710 B2 | 5/2020 | Saeki et al. | |
| 10,880,499 B2 | 12/2020 | Seki | |
| 10,999,551 B2 | 5/2021 | Shimizu et al. | |
| 11,268,851 B2 | 3/2022 | Kobayashi et al. | |
| 11,303,830 B2 | 4/2022 | Kumagai | |
| 11,405,565 B2 | 8/2022 | Seki | |
| 11,431,929 B2 | 8/2022 | Kobayashi et al. | |
| 11,463,644 B2 | 10/2022 | Soda et al. | |
| 11,470,275 B2 | 10/2022 | Kobayashi et al. | |
| 11,496,704 B2 | 11/2022 | Sato et al. | |
| 11,736,813 B2 * | 8/2023 | Kobayashi | H04N 25/75 |
| 2010/0289931 A1 | 11/2010 | Shibata et al. | |
| 2012/0175503 A1 | 7/2012 | Kuroda et al. | |
| 2012/0217378 A1 | 8/2012 | Shibata et al. | |
| 2013/0140440 A1 | 6/2013 | Kobayashi | |
| 2015/0189214 A1 * | 7/2015 | Kurose | H01L 27/14612 250/208.1 |
| 2015/0326811 A1 | 11/2015 | Nishida et al. | |
| 2015/0339988 A1 * | 11/2015 | Kurasawa | G02F 1/133514 349/37 |
| 2016/0227141 A1 | 8/2016 | Kobayashi et al. | |
| 2017/0006238 A1 | 1/2017 | Kenzaburo | |
| 2017/0163922 A1 * | 6/2017 | Hagihara | H04N 25/617 |
| 2019/0082124 A1 | 3/2019 | Seki | |
| 2020/0059620 A1 * | 2/2020 | Shimizu | H04N 25/76 |
| 2021/0021770 A1 | 1/2021 | Nakazawa et al. | |
| 2021/0075979 A1 | 3/2021 | Seki | |
| 2021/0112211 A1 | 4/2021 | Kumagai | |
| 2021/0360180 A1 | 11/2021 | Saito et al. | |
| 2022/0030164 A1 | 1/2022 | Kobayashi | |
| 2022/0247964 A1 | 8/2022 | Kobayashi | |
| 2022/0272295 A1 | 8/2022 | Kobayashi et al. | |
| 2022/0302199 A1 | 9/2022 | Kobayashi | |
| 2022/0303484 A1 | 9/2022 | Kobayashi | |
| 2022/0303485 A1 | 9/2022 | Kobayashi et al. | |
| 2022/0303486 A1 | 9/2022 | Kobayashi | |
| 2023/0353907 A1 * | 11/2023 | Moue | H04N 25/78 |
| 2024/0022838 A1 * | 1/2024 | Muto | H04N 25/59 |
| 2024/0048862 A1 * | 2/2024 | Iwata | H04N 25/709 |

FOREIGN PATENT DOCUMENTS

| | | |
|---|---|---|
| JP | 2015-128278 A | 7/2015 |
| JP | 2020-198640 A | 12/2020 |
| JP | 2021-064859 A | 4/2021 |
| WO | 2013/129202 A1 | 9/2013 |
| WO | 2018/198802 A1 | 11/2018 |

* cited by examiner

SOLID-STATE IMAGING DEVICE

BACKGROUND OF THE INVENTION

Field of the Invention

The present disclosure relates to a solid-state imaging device.

Description of the Related Art

A solid-state imaging device including a plurality of counters each to be shared by each group of a plurality of pixel columns is disclosed in WO 2013/129202.

When the plurality of counters are arranged in a column circuit region, column-to-column characteristic differences are likely to appear, which may degrade an image quality.

SUMMARY OF THE INVENTION

An object of the present disclosure is to provide a solid-state imaging device in which column-to-column characteristic differences in a column circuit are suppressed.

The first aspect of the disclosure is a solid-state imaging device comprising: a pixel array including pixels arranged in a plurality of rows and in a plurality of columns; a first column circuit group; a second column circuit group disposed in the same side with respect to the pixel array as that in which the first column circuit group is disposed; a first counter configured to supply a count signal to the first column circuit group; and a second counter configured to supply a count signal to the second column circuit group, wherein the first column circuit group and the second column circuit group are arranged to be separate from each other in a direction along the columns, and wherein the first column circuit group and the second column circuit group are configured to process pixel signals for different colors.

The second aspect of the disclosure is a solid-state imaging device comprising: a pixel array including pixels arranged in a plurality of rows and in a plurality of columns; a first column circuit group; a second column circuit group disposed in the same side with respect to the pixel array as that in which the first column circuit group is disposed; a first counter configured to supply a count signal to the first column circuit group; and a second counter configured to supply a count signal to the second column circuit group, wherein the first column circuit group and the second column circuit group are arranged to be separate from each other in a direction in which pixel signals are read, and wherein the first column circuit group and the second column circuit group are configured to process the pixel signals for different colors.

The present disclosure is able to provide a solid-state imaging device in which column-to-column characteristic differences in a column circuit are suppressed.

Further features of the present invention will become apparent from the following description of exemplary embodiments with reference to the attached drawings.

DESCRIPTION OF THE EMBODIMENTS

Figure 1:
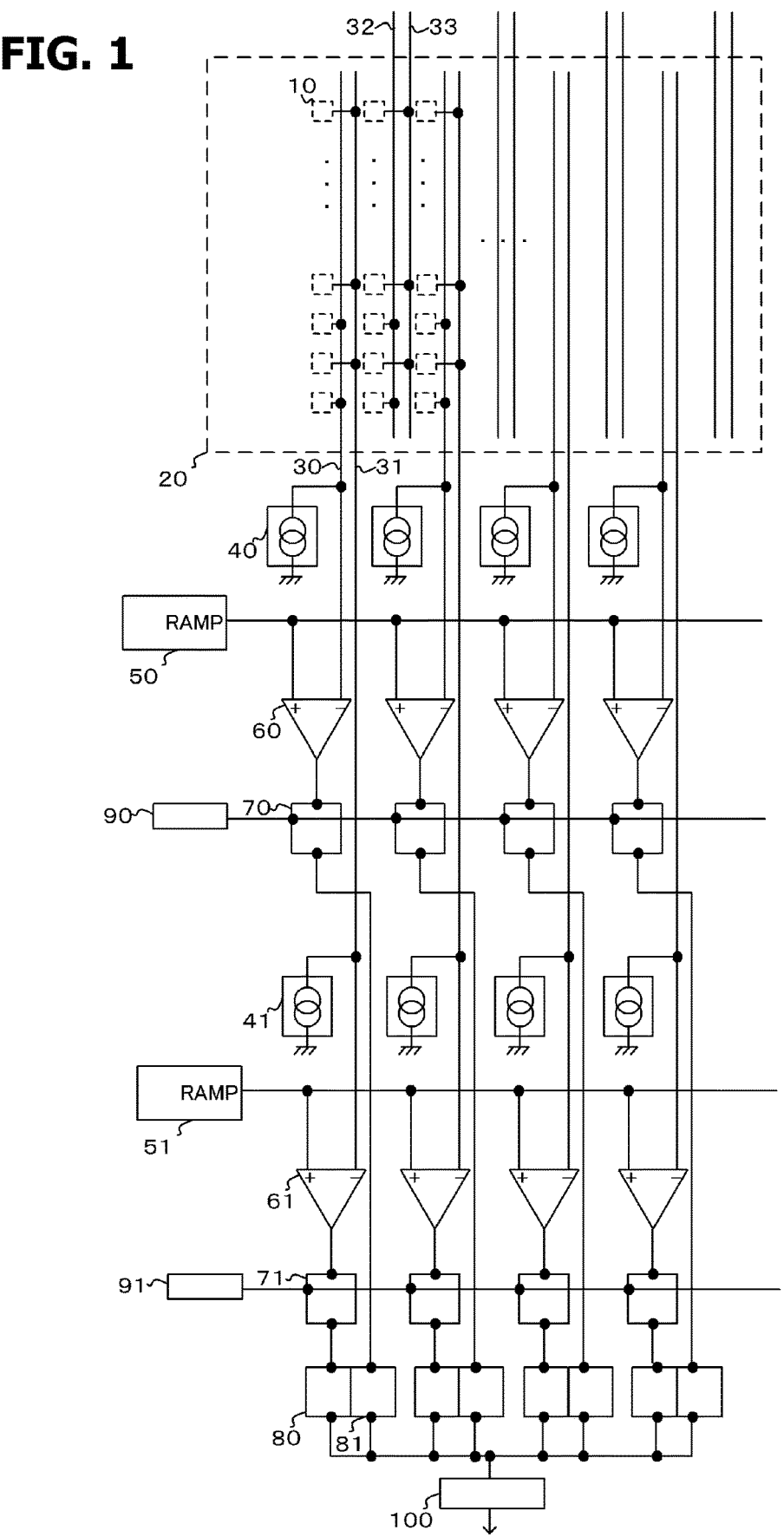
FIG. 1 is a schematic diagram of a solid-state imaging device according to a first embodiment.

Referring to the drawings, a specific description will be given below of embodiments of a solid-state imaging device according to the present disclosure. Note that the following description is only an example for describing the present disclosure, and the present disclosure is not limited to the following embodiments. The present disclosure can variously be modified within the scope of the technical idea thereof.

First Embodiment

FIG. 1 is a schematic diagram illustrating a configuration of a solid-state imaging device according to the first embodiment. In FIG. 1, 10 denotes pixels, 20 denotes a pixel array, 30 to 33 denote vertical lines, 40 and 41 denote current sources, 50 and 51 denote ramp signal generation circuits, 60 and 61 denote comparators, 70 and 71 denote first memories, 80 and 81 denote second memories, 90 and 91 denote counters, and 100 denotes an output circuit.

Figure 2:
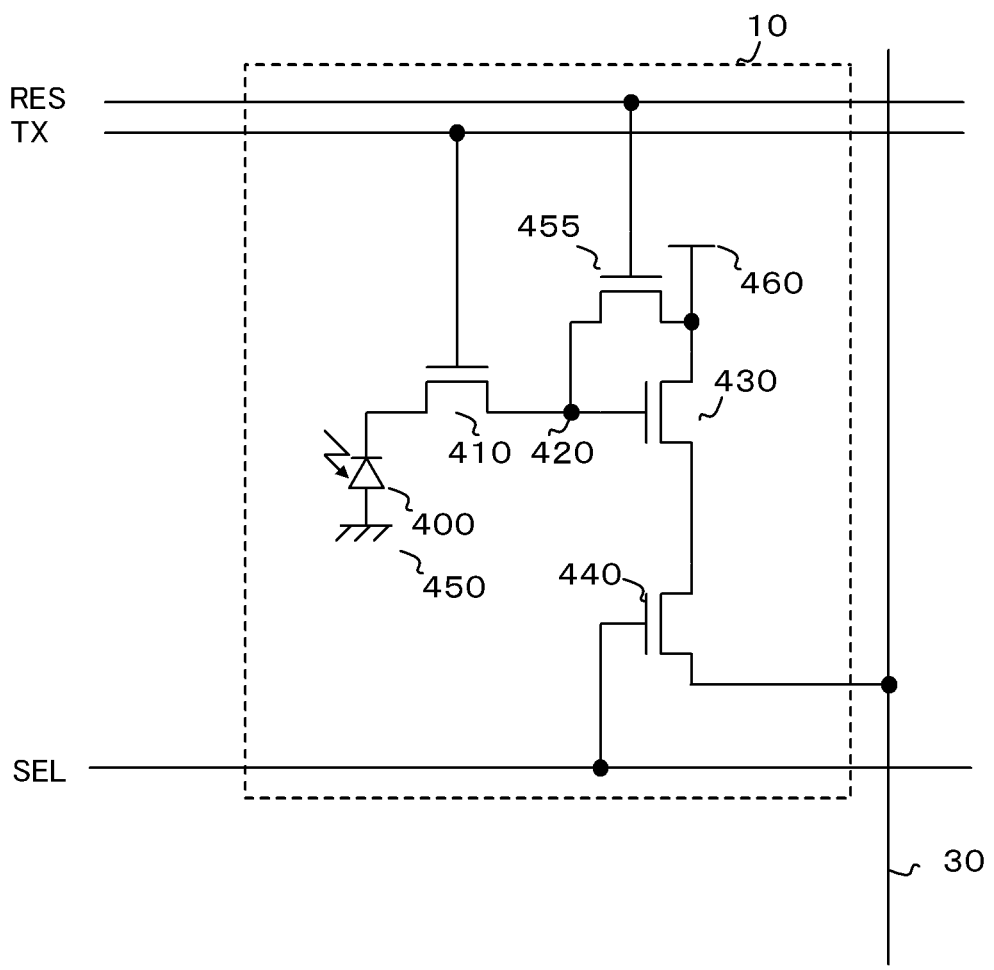
FIG. 2 is a schematic diagram of the solid-state imaging device according to the first embodiment.

In the pixel array 20, the pixels 10 are arranged in a plurality of rows and in a plurality of columns. FIG. 2 is a diagram illustrating an example of a circuit of each of the pixels 10. In FIG. 2, 400 denotes a photodiode, 410 denotes a transfer transistor, 420 denotes a floating diffusion, 430 denotes a source follower transistor, 440 denotes a selection transistor, and 455 denotes a reset transistor. The reset transistor 455 resets the floating diffusion 420. Photocharge generated in the photodiode 400 is transferred to the floating diffusion 420 through turning ON of the transfer transistor 410 and converted to a signal voltage by a parasitic capacitance accompanying the floating diffusion 420. Then, the signal voltage is output to the vertical line 30 via each of the source follower transistor 430 and the selection transistor 440. The source follower transistor 430 is included together with the current source 40 in FIG. 1 in the source follower, and the signal voltage on the floating diffusion 420 is buffered in the source follower to be output to the vertical line 30.

Each of the vertical lines (pixel signal lines) 30 and 31 outputs pixel signals from the pixels 10 in different rows in the one of the pixel columns, and the comparators 60 and 61 compare the signals from the vertical lines 30 and 31 to ramp signals output from the ramp signal generation circuits 50 and 51. The first memories 70 and 71 retrieve count signals from the counters 90 and 91 at timing of inversion of outputs from the comparators 60 and 61. As a result, the signals from the pixels 10 are subjected to AD conversion. Digital signals in the first memories 70 and 71 are transferred therefrom to the second memories 80 and 81, and then output to the outside of a chip via the output circuit 100.

The current source 40, the comparator 60, and the first memory 70 corresponding to one of the pixel columns correspond to a first column circuit, while the current source 41, the comparator 61, and the first memory 71 corresponding to another one of the pixel columns correspond to a second column circuit. A first column circuit group includes the first column circuits in a plurality of columns, while a second column circuit group includes the second column circuits in the plurality of columns. The first column circuit group and the second column circuit group are arranged to be separate from each other in a direction in which the pixel signals are read. In the first embodiment, the direction in which the pixel signals are read is parallel to the pixel columns, which is a vertical direction in FIG. 1. In other words, the first column circuit group and the second column circuit group are arranged to be separate from each other in a direction along the columns (column direction). In addition, the first column circuit group and the second column circuit group are arranged to be aligned. Note that the first column circuit group and the second column circuit group each described above are arranged in the same side (on a lower side of the drawing in FIG. 1) with respect to the pixel array 20. The counters 90 and 91 are used to supply the count signals respectively to the first memory 70 and the first memory 71 in the first column circuit group and the second column circuit group thus arranged to be separate from each other.

Note that, in FIG. 1, circuits subsequent to the vertical lines 32 and 33 connected to the pixels 10 in an odd-numbered column in the pixel array 20 are substantially the same as those connected to the vertical lines 30 and 31, and therefore the illustration thereof is omitted.

Figure 3:
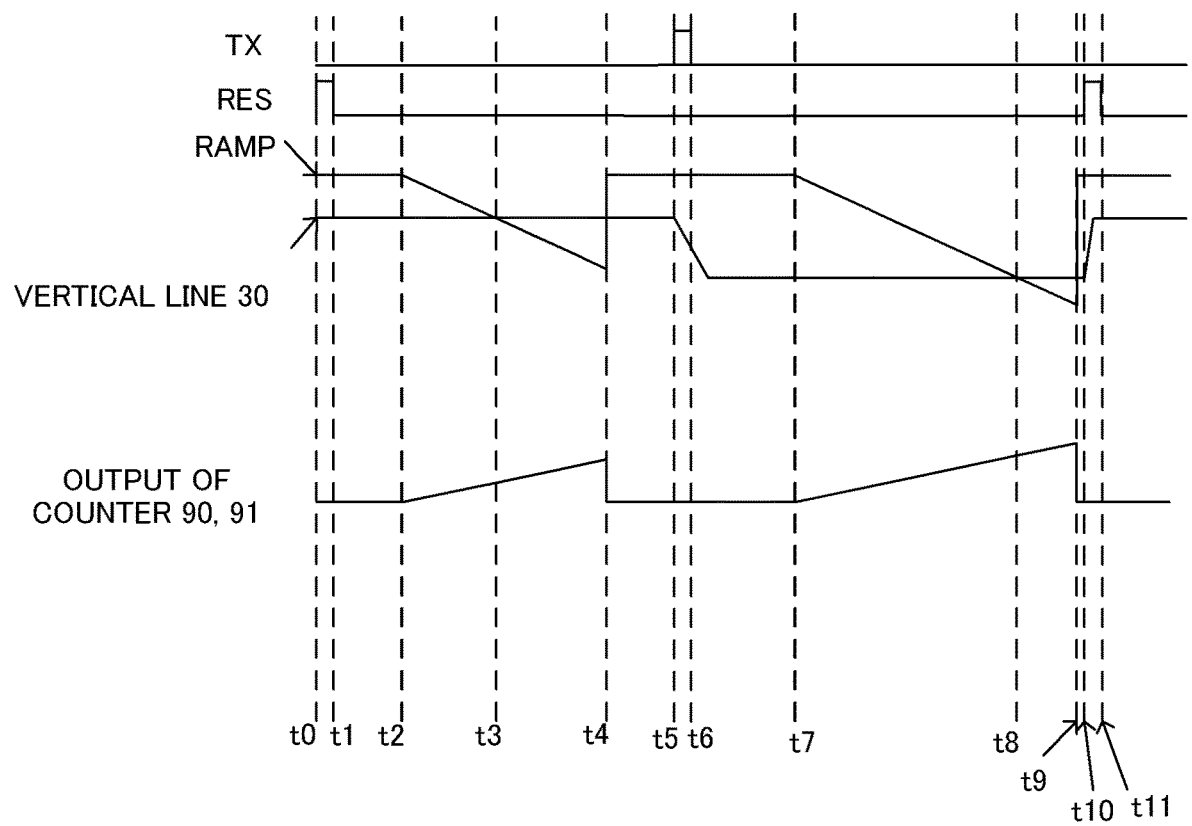
FIG. 3 is a timing chart of the solid-state imaging device according to the first embodiment.

FIG. 3 is a timing chart illustrating an operation of the solid-state imaging device according to the first embodiment. Referring to FIG. 3, a description will be given below of the operation.

At times t0 to t1, a control signal RES in FIG. 2 is on a HIGH level to turn ON the reset transistor 455 and thereby reset the floating diffusion 420. Accordingly, a potential in each of the vertical lines 30 and 31 is on a reset level. At the time t1, the control signal RES is brought to a LOW level to turn OFF the reset transistor 455. Then, at a time t2, a slope operation of the RAMP signal is started. In addition, each of counter signals output from the counters 90 and 91 continues to be counted up. At a time t3, the RAMP signal to be input to each of the comparators becomes equal to a signal in the corresponding vertical line to invert the output from the comparator. A time period required by the inversion to occur is measured by the counters 90 and 91 and held in the first memories 70 and 71, thereby effecting AD conversion of the reset level. At a time t4, the RAMP signal is reset.

At times t5 to t6, a control signal TX in FIG. 2 is on the HIGH level to turn ON the transfer transistor 410 and thereby allow the photocharge to be transferred from the photodiode 400 to the floating diffusion 420. A potential at the floating diffusion 420 decreases depending on an amount of the charge. As a result, the potential in each of the vertical lines 30 and 31 decreases. At a time t7, the slope operation of the RAMP signal is started again. At a time t8, the output from the comparator is inverted again. By measuring the time period to the inversion by using the counter, an optical signal level is subjected to the AD conversion.

In the first embodiment, the plurality of counters 90 and 91 are used to reduce the numbers of the first memories 70 and 71 respectively connected thereto and allow higher speeds to be achieved. In addition, the counter 91 is configured to supply the count signal to the first memory 71 disposed to be separate from the first memory 70 in the signal read direction (the vertical direction in the drawing). Thus, an increase in the number of the counters to be arranged in the column circuit region in which the first memories 70 and 71 and the like are provided is inhibited, unlike in the conventional technology. This suppresses appearance of column-to-column characteristic differences.

Note that, in FIG. 1, when pixels in odd-numbered rows and pixels in even-numbered rows in the pixel array 20 correspond to different color components, the counters 90 and 91 in FIG. 1 are configured to correspond to different color signals. Such a configuration can suppress appearance of characteristic differences within the same color.

Note that forms of the imaging device and the solid-state imaging device are not limited to those described above. For example, each of the pixels 10 is not limited to that illustrated in FIG. 2. The pixel 10 may also be configured such that a capacitance of the floating diffusion 420 is switchable. The pixel 10 may also have a form in which the plurality of photodiodes 400 share the floating diffusion 420. The pixel may also be such that the plurality of photodiodes 400 are formed under the same microlens to allow a phase difference to be detected. Alternatively, the pixel may also have a form having a plurality of the selection transistors 440. Each of the comparators 60 and 61 may also be configured to have a capacitor and a switch each for an auto-zero operation.

Second Embodiment

Figure 4:
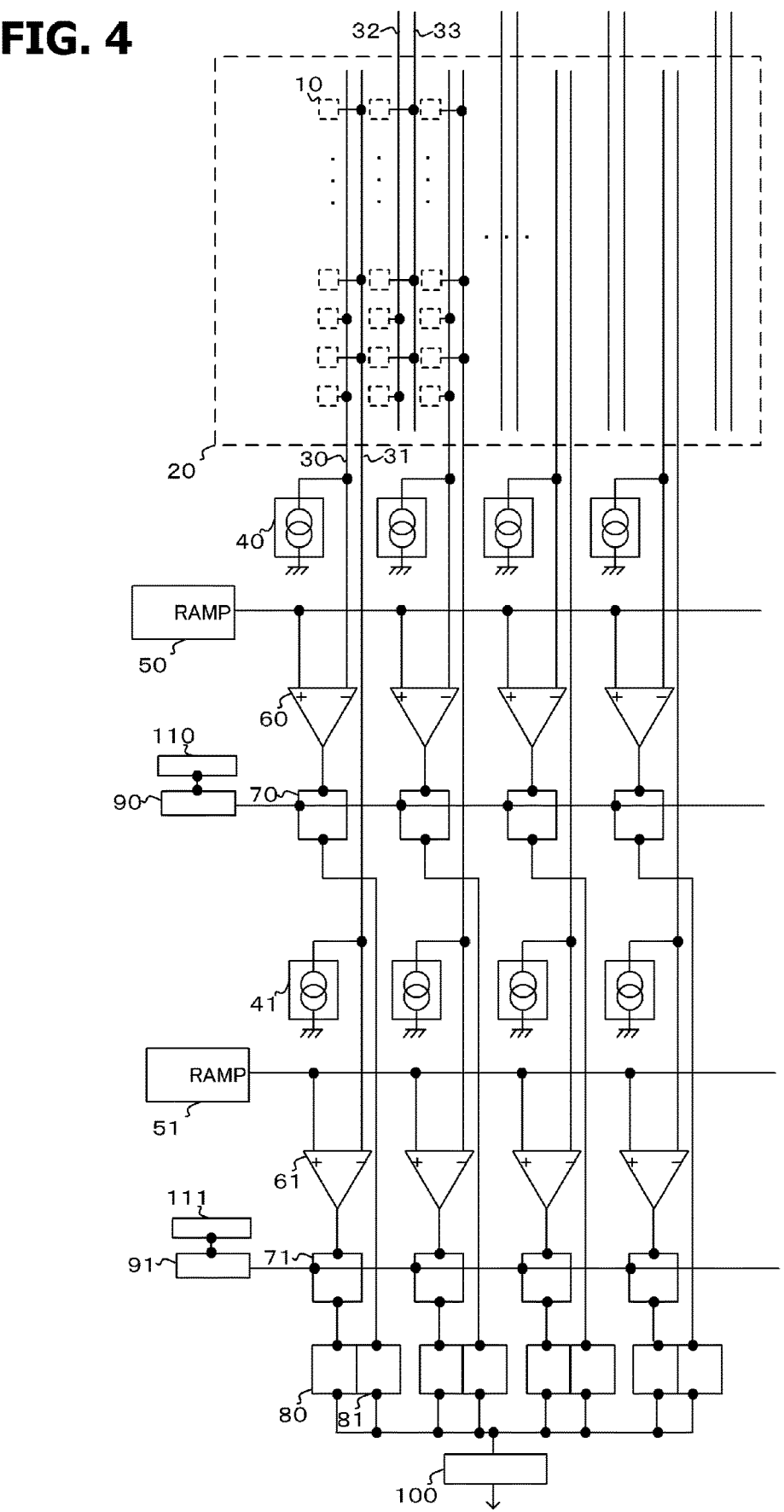
FIG. 4 is a schematic diagram of a solid-state imaging device according to a second embodiment.

FIG. 4 illustrates a schematic diagram of a solid-state imaging device according to the second embodiment. Hereinbelow, a description will be given only of a difference from FIG. 1 in the first embodiment.

In the second embodiment, two clock generators, i.e., a clock generator 110 that supplies a clock signal to the counter 90 and a clock generator 111 that supplies a clock signal to the counter 91 are used. The clock generators 110 and 111 are provided in proximity to the respective counters 90 and 91. This can achieve shorter clock transmission distances, lower power consumption, and higher speeds than in a case where a clock is supplied from one clock generator to the counters 90 and 91 arranged to be separate from each other.

Third Embodiment

Figure 5:
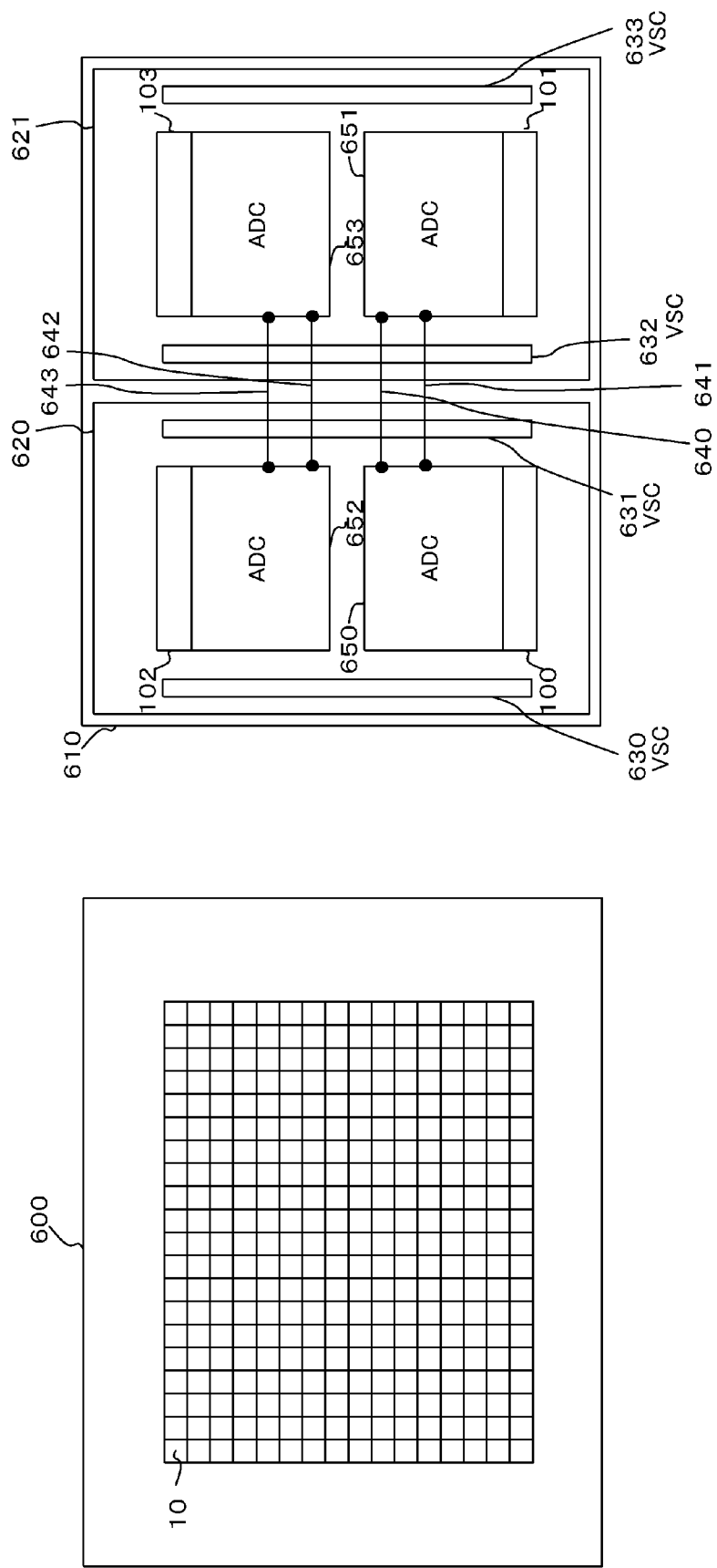
FIG. 5 is a schematic diagram of a solid-state imaging device according to a third embodiment.

FIG. 5 illustrates a schematic diagram of a solid-state imaging device according to the third embodiment. Hereinbelow, a description will be given only of a difference from FIG. 1 in the first embodiment.

In FIG. 5, 600 denotes a pixel substrate, while 610 denotes a circuit substrate. The third embodiment provides a layer-stacked solid-state imaging device including the pixel substrate 600 and the circuit substrate 610. The circuit substrate 610 has two signal processing circuits 620 and 621. The signal processing circuits 620 and 621 are produced by exposing a left half surface (the signal processing circuit 620) and the right half surface (the signal processing circuit 621) of the circuit substrate 610 to light by using a common mask set in two steps to have substantially identical configurations. However, by subjecting only upper-layer metal to one-shot exposure, it is possible to vary respective wired states in the signal processing circuits 620 and 621. Additionally, 630 to 633 denote vertical scanning circuits (row selection circuits), while 640 and 641 denote wires connecting the two signal processing circuits. Moreover, 650 to 653 denote ADCs (AD converters) that process signals from the pixels 10, while 100 to 103 denote output circuits that process signals from the ADCs 650 to 653 and output the processed signals to the outside. In the signal processing circuit 620, the ADCs 650 and 652 are located between the vertical scanning circuits 630 and 631 while, in the signal processing circuit 621, the ADCs 651 and 653 are located between the vertical scanning circuits 632 and 633. Signals from the rows of the pixels 10 of the pixel substrate 600 selected by the vertical scanning circuits 630 to 633 are read to the ADCs 650 to 653 of the circuit substrate 610 via a substrate-to-substrate junction not shown.

Figure 6:
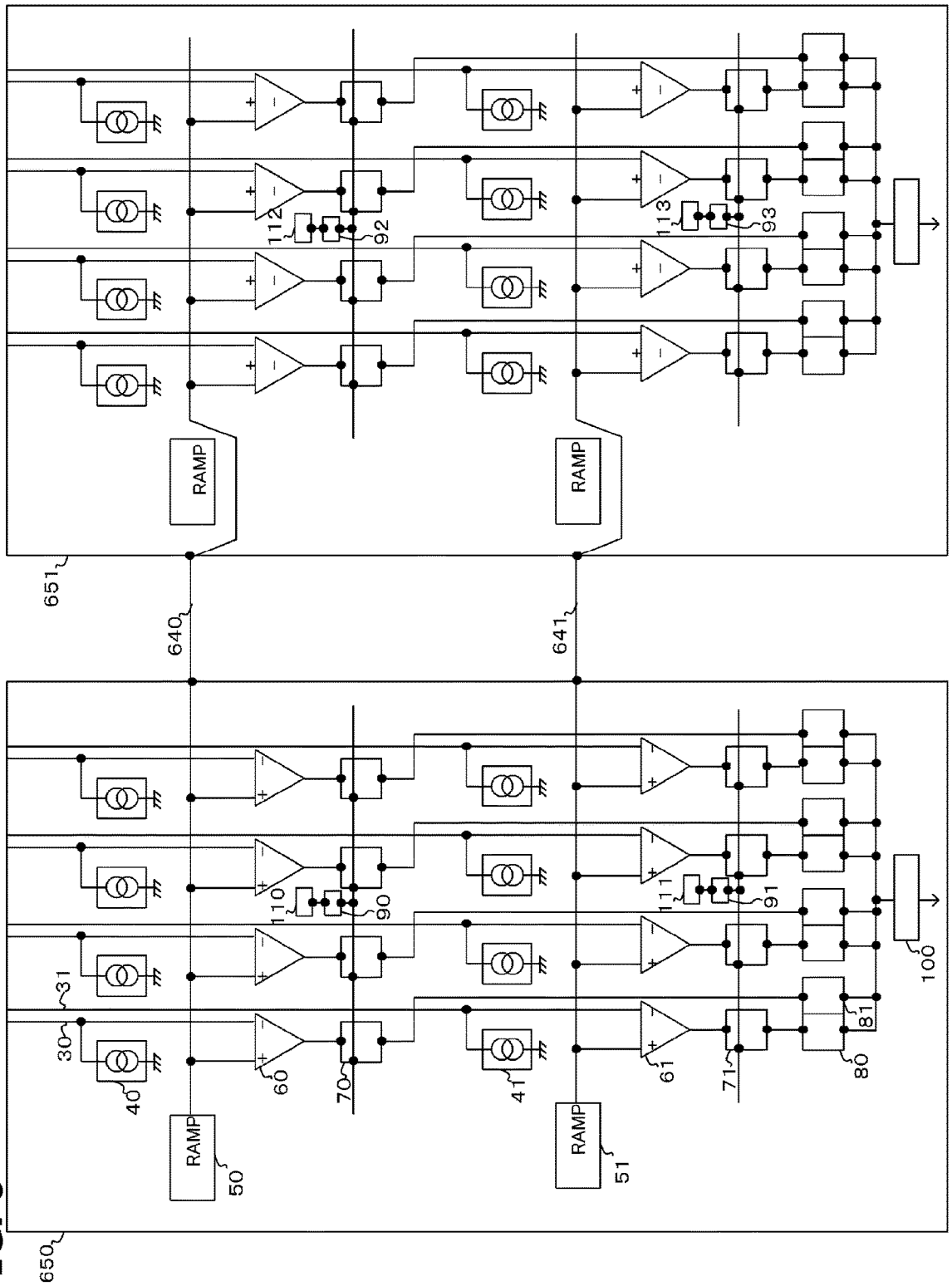
FIG. 6 is a schematic diagram of the solid-state imaging device according to the third embodiment.

FIG. 6 illustrates an example of the wires 640 and 641 providing connection between the ADCs 650 and 651 and the signal processing circuits. In FIG. 6, circuits of the ADCs 650 and 651 are substantially the same as those in FIG. 1. Note that, since the ADCs 650 and 651 have substantially identical configurations, a ramp signal generation circuit is also present in the ADC 651, but is out of use and non-operative. Instead, the ramp signal generated from the ramp signal generation circuit 50 is supplied to the ADC 651 via the wire 640 providing the connection between the signal processing circuits to thereby reduce a characteristic difference between the ADCs 650 and 651.

The ADC 650 includes the plurality of counters 90 and 91 and the plurality of clock generators 110 and 111, while the ADC 651 also includes a plurality of counter 92 and 93 and a plurality of clock generators 112 and 113. This reduces loads on the counters 90 to 93 in both of the signal processing circuits 620 and 621 and allows higher speeds to be achieved. In addition, the clock generators 110 and 111 are arranged in proximity to the counters 90 and 91 to thus allow higher speeds to be achieved.

Additionally, in the third embodiment, the clock generators 110 to 113 and the counters 90 to 93 are arranged substantially at centers of the signal processing circuits 620 and 621. In other words, the clock generators 110 to 113 and the counters 90 to 93 are arranged substantially at middles of the column circuit groups to which the count signals are to be supplied in the column direction. This reduces distances to the first memories 70 and 71 most distant from the counters 90 to 93 and allows higher-speed operations to be performed.

While FIG. 5 illustrates an example of two-layer stacking, three-layer stacking may also be achieved.

Fourth Embodiment

Figure 7:
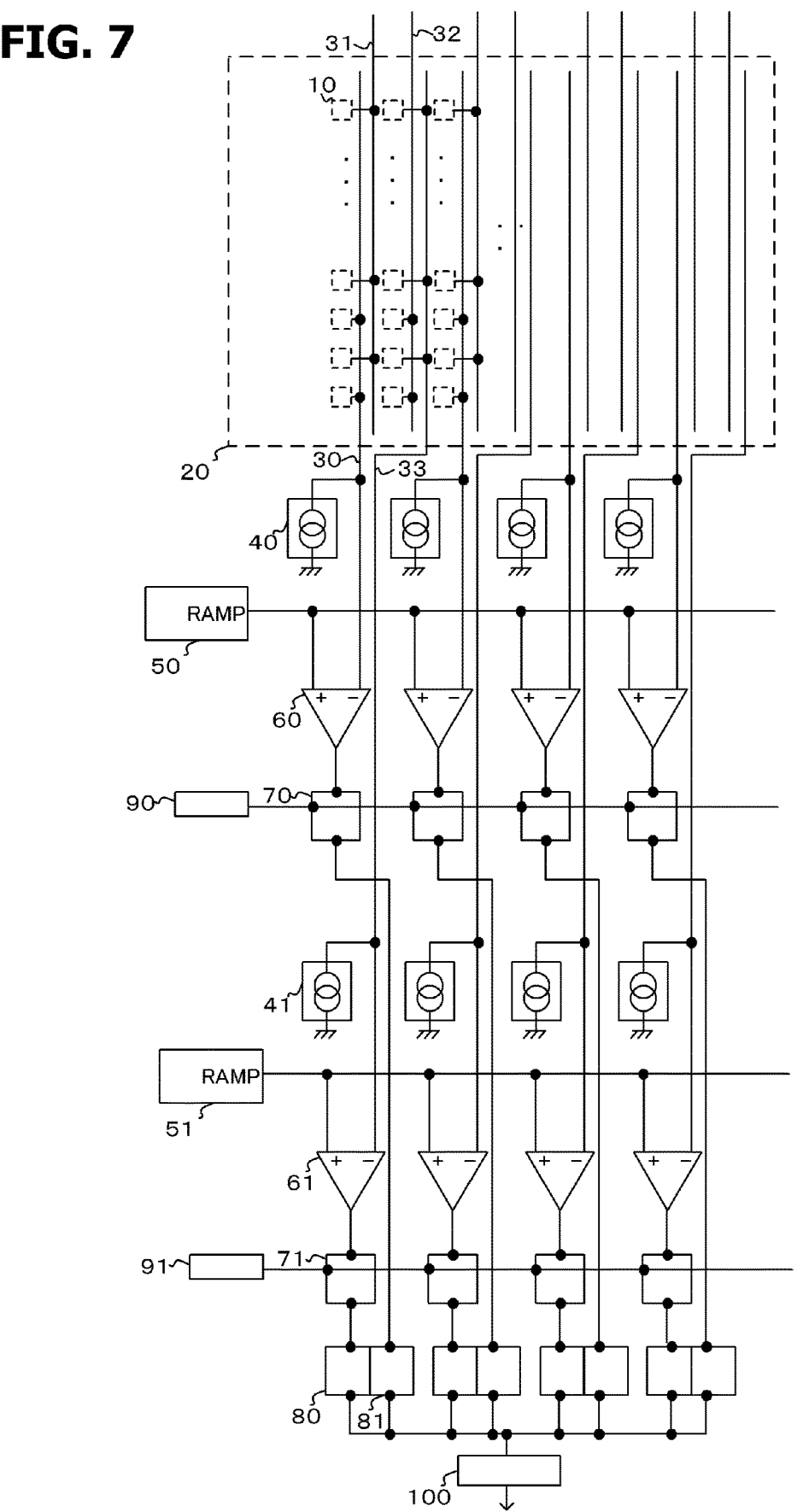
FIG. 7 is a schematic diagram of a solid-state imaging device according to a fourth embodiment.

FIG. 7 illustrates a schematic diagram of a solid-state imaging device according to the fourth embodiment. Hereinbelow, a description will be given only of a difference from FIG. 1 in the first embodiment.

In the fourth embodiment, the comparator 60 and the first memory 70 process the pixel signals output from the vertical line 30, while the comparator 61 and the first memory 71 process the pixel signals output from the vertical line 33. Thus, in the fourth embodiment, the column circuits that process the pixel signals from the different pixel columns are arranged to be aligned in the signal read direction. Additionally, the pixel signals output from the vertical lines 31 and 32 are also processed by the column circuits (not shown) arranged to be aligned in the signal read direction on an opposite side (an upper side of the drawing) of the pixel array 20.

Thus, even the configuration in which the columns circuits arranged to be aligned in the signal read direction process the signals from the different pixel columns can suppress appearance of column-to-column characteristic differences in the same manner as in the first embodiment.

Figure 8:
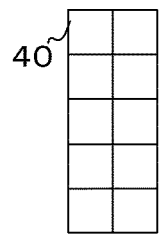
FIG. 8 is a schematic diagram of the solid-state imaging device according to the fourth embodiment.
Figure 8:
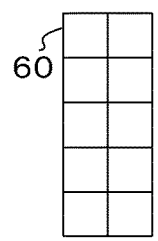
Figure 8:
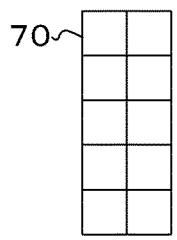
Figure 8:
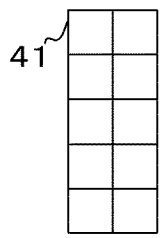
Figure 8:
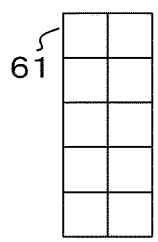
Figure 8:
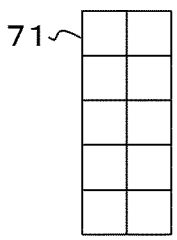

Note that, for each one of the pixel columns, three or more vertical lines may also be provided. For example, for each one of the pixel columns, twenty vertical lines may also be provided. More specifically, in the configuration in FIG. 7, the number of each of the vertical lines 30 to 33 to be provided may be 10. FIG. 8 schematically illustrates an example of an arrangement of the column circuits in such a configuration.

As illustrated in FIG. 8, the current sources 40, the comparators 60, the first memories 70, the current sources 41, the comparators 61, and the first memories 71 are each arranged in five rows and in two columns (a total number of each component is 10), and these arrangements are arranged to be aligned in the column direction. The current sources 40, the comparators 60, and the first memories 70 process the pixel signals output from the ten vertical lines 30. The current sources 41, the comparators 61, and the first memories 71 process the pixel signals output from the ten vertical lines 33.

To each of the first memories 70, the count signal from the one of the counters 90 is supplied while, to each of the first memories 71, the count signal from the one of the counters 91 is supplied. It may also be possible to assign the first memories 70 to two or more groups and supply the count signals from the different counters to the individual groups. The same applies also to the first memories 71.

Fifth Embodiment

Figure 9:
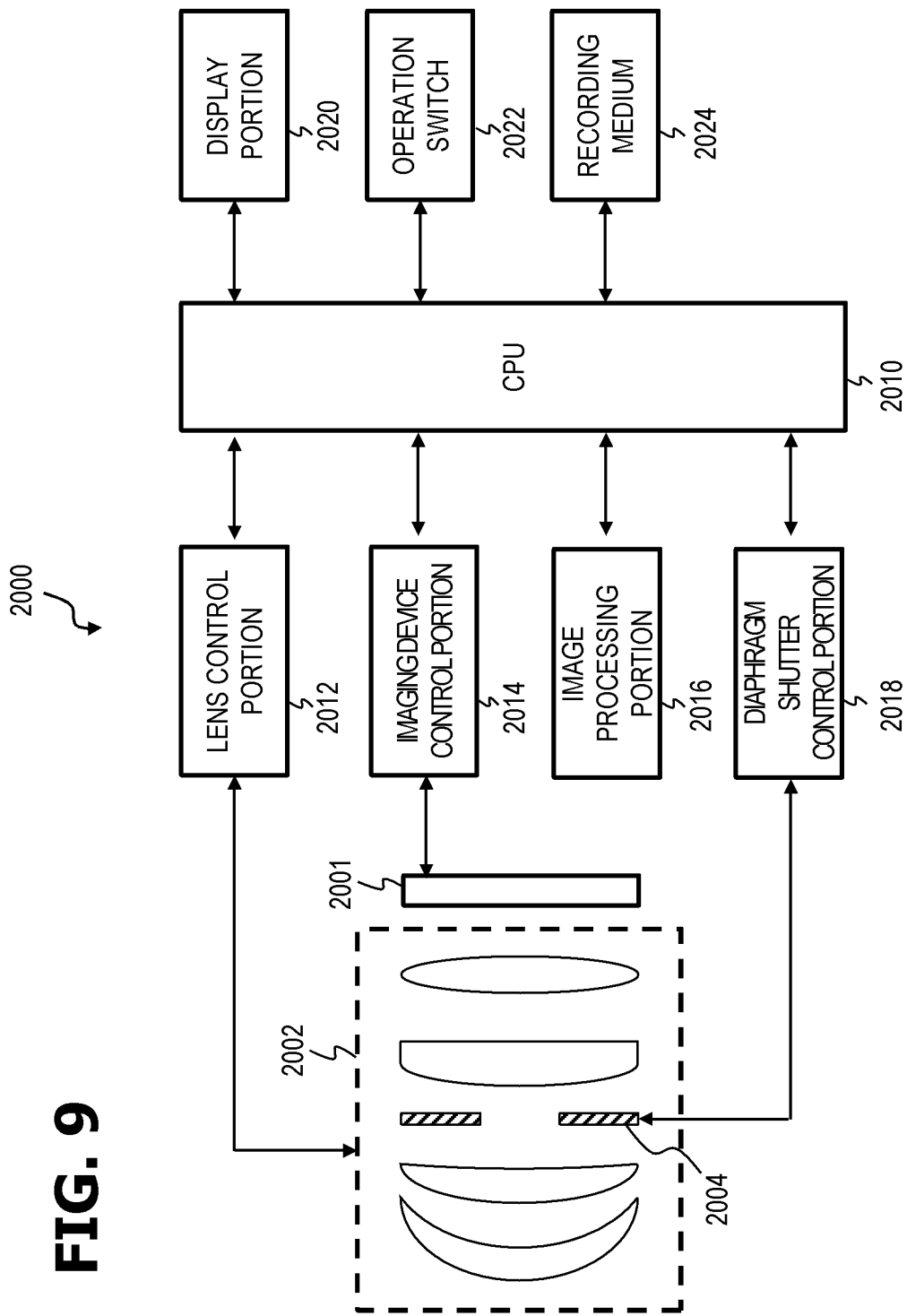
FIG. 9 is a diagram illustrating an example of a configuration of an imaging system according to a fifth embodiment.

An imaging system according to a fifth embodiment of the present invention will be explained with reference to FIG. 9. FIG. 9 is a block diagram of a schematic configuration of an imaging system according to this embodiment.

The solid-state imaging devices (photoelectric conversion devices) described in the above first to fourth embodiments may apply to various imaging systems. Applicable imaging systems may include, but are not limited to, various types of equipment such as a digital still camera, a digital camcorder, a monitor camera, a copying machine, a facsimile, a mobile phone, an in-vehicle camera, an observation satellite, a medical camera, or the like. The imaging systems may also include a camera module including an optical system such as a lens and a solid-state imaging device (photoelectric conversion device). FIG. 9 is a block diagram of a digital still camera as an example of those imaging systems.

FIG. 9 shows an imaging system 2000, which includes an imaging device 2001, an imaging optical system 2002, a CPU 2010, a lens control portion 2012, an imaging device control portion 2014, an image processing portion 2016, and a diaphragm shutter control portion 2018. The imaging system 2000 also includes a display portion 2020, an operation switch 2022, and a recording medium 2024.

The imaging optical system 2002 is an optical system for forming an optical image of the subject, and includes a lens group, a diaphragm 2004, or the like. The diaphragm 2004 has a function of adjusting light intensity during photography by adjusting its opening size. The diaphragm 2004 also functions as an exposure time adjustment shutter during still image photography. The lens group and the diaphragm 2004 are held movable forward and backward in the optical axis direction. These linked operations may provide a scaling function (zoom function) and a focus adjustment function.

The imaging optical system 2002 may be integrated into the imaging system or may be an imaging lens mountable to the imaging system.

The imaging device 2001 is disposed such that its imaging plane is positioned in the image space of the imaging optical system 2002. The imaging device 2001 is one of the solid-state imaging devices (photoelectric conversion devices) explained in the first to fourth embodiments. The imaging device 2001 includes a CMOS sensor (pixel portion) and its peripheral circuits (peripheral circuit area). The imaging device 2001 includes a plurality of pixels arranged in two dimensions, each pixel including a photoelectric conversion portion. These pixels are provided with color filters to form a two-dimensional single-plate color sensor. The imaging device 2001 may photoelectrically convert a subject image imaged by the imaging optical system 2002 for output as an image signal and/or a focus detection signal.

The lens control portion 2012 is to control the forward and backward driving of the lens group in the imaging optical system 2002 to perform scaling operation and focus adjustment. The lens control portion 2012 includes a circuit and/or processing unit configured to achieve those functions. The diaphragm shutter control portion 2018 is to change the opening size of the diaphragm 2004 (for a variable diaphragm value) to adjust light intensity during photography, and is constituted of a circuit and/or processing unit configured to achieve those functions.

The CPU 2010 is a control unit in a camera responsible for various controls of the camera bod, and includes an operation portion, a ROM, a RAM, an A/D converter, a D/A converter, a communication interface circuit, or the like. The CPU 2010 controls the operation of each portion in the camera according to a computer program stored in a ROM or the like. The CPU 2010 performs a series of photography operations such as AF, imaging, image processing, and recording, including detection of the focus state (focus detection) of the imaging optical system 2002. The CPU 2010 also serves as a signal processing portion.

The imaging device control portion 2014 is to control the operation of the imaging device 2001 and to A/D convert a signal output from the imaging device 2001 and transmit the result to the CPU 2010, and includes a circuit and/or control unit configured to achieve those functions. The imaging device 2001 may have the A/D conversion function. The image processing portion 2016 is a processing unit that subjects the A/D converted signal to processing such as y conversion and color interpolation to generate an image signal. The image processing portion 2016 includes a circuit and/or control unit configured to achieve those functions. The display portion 2020 is a display device such as a liquid crystal display device (LCD), and displays information related to a photography mode of the camera, a preview image before photography, a check image after photography, the focused state at the focus detection, or the like. The operation switch 2022 includes a power supply switch, a release (photography trigger) switch, a zoom operation switch, a photography mode selection switch, or the like. The recording medium 2024 is to record a photographed image or the like, and may be built in the imaging system or removable such as a memory card.

In this way, the imaging system 2000 applied with the imaging device 2001 according to the first to fourth embodiments may provide a high performance imaging system.

Sixth Embodiment

Figure 10A:
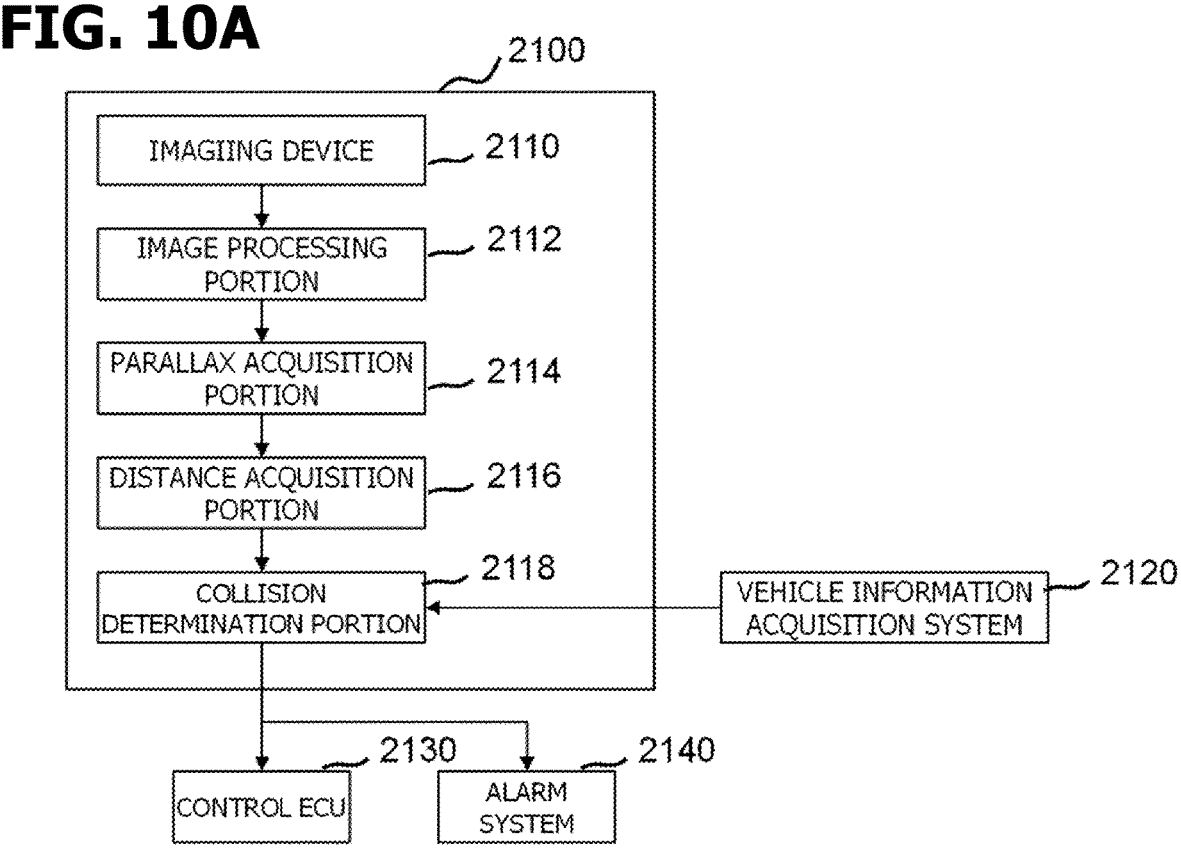
FIGS. 10A and 10B are diagrams illustrating an example of respective configurations of an imaging system and a moving body each according to a sixth embodiment.
Figure 10B:
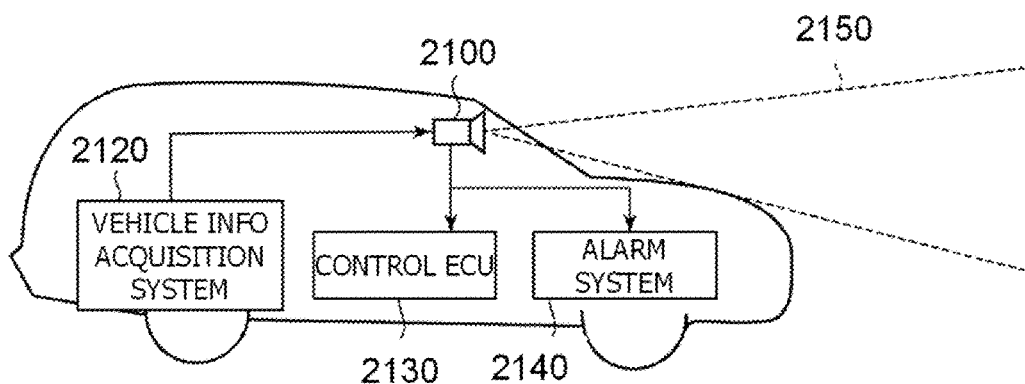

An imaging system and a mobile object according to a sixth embodiment of the present invention will be explained with reference to FIGS. 10A and 10B. FIGS. 10A and 10B show configurations of the imaging system and mobile object according to this embodiment.

FIG. 10A shows an example of an imaging system 2100 associated with an in-vehicle camera. The imaging system 2100 has an imaging device 2110. The imaging device 2110 is any one of the solid-state imaging devices (photoelectric conversion devices) according to the above first to fourth embodiments. The imaging system 2100 has an image processing portion 2112 and a parallax acquisition portion 2114. The image processing portion 2112 is a processing unit that subjects a plurality of sets of image data acquired by the imaging device 2110 to image processing. The parallax acquisition portion 2114 is a processing unit that calculates parallax (a phase difference of a parallax image) from the sets of image data acquired by the imaging device 2110. The imaging system 2100 also includes a distance acquisition portion 2116, which is a processing unit that calculates the distance to the subject based on the calculated parallax. The imaging system 2100 also includes a collision determination portion 2118, which is a processing unit that determines a possibility of collision based on the calculated distance. Here, the parallax acquisition portion 2114 and the distance acquisition portion 2116 are examples of information acquiring means that acquires information such as distance information to the subject. In other words, the distance information is information related to parallax, defocus amount, the distance to the subject, or the like. The collision determination portion 2118 may determine a possibility of collision using any of the distance information. The above processing unit may be provided by specially designed hardware or may be provided by general hardware that performs operation based on a software module. In addition, the processing unit may be provided by a Field Programmable Gate Array (FPGA), an Application Specific Integrated Circuit (ASIC), or the like or may be provided by a combination thereof.

The imaging system 2100 is connected to a vehicle information acquisition system 2120, and may thus acquire vehicle information including a vehicle speed, a yaw rate, and a rudder angle. The imaging system 2100 also has a control ECU 2130 connected thereto. The ECU 2130 is a control unit that outputs a control signal for generating a braking force to the vehicle based on the determination by the collision determination portion 2118. In other words, the control ECU 2130 is an example of a mobile object control means that controls a mobile object based on the distance information. The imaging system 2100 is also connected to an alarm system 2140. The alarm system 2140 gives an alarm to the driver based on the determination by the collision determination portion 2118. For example, if the collision determination portion 2118 determines a high possibility of collision, the control ECU 2130 performs a vehicle control that avoids collision and reduces damage by braking, releasing the accelerator, limiting the engine output, or the like. The alarm system 2140 warns the user by sounding an alarm such as sound, displaying alarm information on a screen of a car navigation system or the like, giving vibration to a seatbelt and steering, or the like.

In this embodiment, the surroundings of the vehicle such as front or rear are imaged by the imaging system 2100. FIG. 10B shows the imaging system 2100 when imaging the front of the vehicle (imaging range 2150). The vehicle information acquisition system 2120 directs the imaging system 2100 to operate and perform imaging. Using the imaging devices according to the above first to fourth embodiments as the imaging device 2110, the imaging system 2100 in this embodiment may provide more improved ranging accuracy.

Although the above description shows an example control that prevents collision with other vehicles, the present invention may also apply to a control of autonomous driving following other vehicles, a control of autonomous driving preventing running over a traffic lane, or the like. In addition to a vehicle such as a car, the imaging system may also apply to, for example, a mobile object (transportation equipment) such as a vessel, an aircraft, or an industrial robot. The moving device in the mobile object (transportation equipment) is one of various types of drive sources, including an engine, a motor, a wheel, and a propeller. In addition to a mobile object, the imaging system may also apply to equipment, such as Intelligent Transport Systems (ITS), that commonly uses the object recognition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-146388, filed on Sep. 8, 2021, which is hereby incorporated by reference herein in its entirety.

What is claimed is:

1. A solid-state imaging device comprising:
a pixel array including pixels arranged in a plurality of rows and in a plurality of columns;
a first column circuit group;
a second column circuit group disposed in the same side with respect to the pixel array as that in which the first column circuit group is disposed;
a first counter configured to supply a count signal to the first column circuit group; and
a second counter configured to supply a count signal to the second column circuit group,
wherein the first column circuit group and the second column circuit group are arranged to be separate from each other in a direction along the columns,
wherein the first column circuit group and the second column circuit group are configured to process pixel signals for different colors.

2. The solid-state imaging device according to claim 1, wherein the first column circuit group and the second column circuit group are arranged to be aligned.

3. The solid-state imaging device according to claim 1, further comprising:
a first clock generator configured to supply a clock signal to the first counter; and
a second clock generator configured to supply a clock signal to the second counter.

4. The solid-state imaging device according to claim 1,
wherein the first counter is disposed substantially at a middle of the first column circuit group in a column direction, or
wherein the second counter is disposed substantially at a middle of the second column circuit group in the column direction.

5. The solid-state imaging device according to claim 1, further comprising:
a first substrate provided with the pixel array; and
a second substrate provided with at least any of the first column circuit group, the second column circuit group, the first counter, and the second counter,
wherein the first substrate and the second substrate are stacked in layers.

6. The solid-state imaging device according to claim 1, further comprising:
a plurality of signal processing circuits,
wherein each of the plurality of signal processing circuits includes the first column circuit group, the second column circuit group, the first counter, and the second counter.

7. An imaging system comprising:
the solid-state imaging device according to claim 1; and
a signal processing unit configured to process a signal output from the solid-state imaging device.

8. A moving body comprising;
the solid-state imaging device according to claim 1;
a moving device;
a processing device configured to acquire information from a signal output from the solid-state imaging device; and
a control device that controls the moving device on the basis of the information.

9. A solid-state imaging device comprising:
a pixel array including pixels arranged in a plurality of rows and in a plurality of columns;
a first column circuit group;
a second column circuit group disposed in the same side with respect to the pixel array as that in which the first column circuit group is disposed;
a first counter configured to supply a count signal to the first column circuit group; and
a second counter configured to supply a count signal to the second column circuit group,
wherein the first column circuit group and the second column circuit group are arranged to be separate from each other in a direction in which pixel signals are read,
wherein the first column circuit group and the second column circuit group are configured to process the pixel signals for different colors.

10. A solid-state imaging device comprising:
a pixel array including pixels arranged in a plurality of rows and in a plurality of columns; and
a plurality of signal processing circuits,
each of the plurality of signal processing circuits including:
a first column circuit group;
a second column circuit group disposed in the same side with respect to the pixel array as that in which the first column circuit group is disposed;
a first counter configured to supply a count signal to the first column circuit group; and
a second counter configured to supply a count signal to the second column circuit group,
wherein the first column circuit group and the second column circuit group are arranged to be separate from each other in a direction along the columns,
wherein, in at least one of the plurality of signal processing circuits, the first column circuit group, the second column circuit group, the first counter, and the second counter are located between a plurality of scanning circuits each of which scans the plurality of pixels in each of the rows.

11. The solid-state imaging device according to claim 10, wherein the first column circuit group and the second column circuit group are arranged to be aligned.

12. The solid-state imaging device according to claim 10, wherein each of the plurality of signal processing circuits further includes:
a first clock generator configured to supply a clock signal to the first counter; and a second clock generator configured to supply a clock signal to the second counter.

13. The solid-state imaging device according to claim 10, wherein, in at least one of the plurality of the signal processing circuits, the first counter is disposed substantially at a middle of the first column circuit group in a column direction, or wherein the second counter is disposed substantially at a middle of the second column circuit group in the column direction.

14. The solid-state imaging device according to claim 10, further comprising:

a first substrate provided with the pixel array; and a second substrate provided with the plurality of signal processing circuits, wherein the first substrate and the second substrate are stacked in layers.

15. An imaging system comprising:

the solid-state imaging device according to claim 10; and a signal processing unit configured to process a signal output from the solid-state imaging device.

16. A moving body comprising;

the solid-state imaging device according to claim 10;

a moving device;

a processing device configured to acquire information from a signal output from the solid-state imaging device; and a control device configured to control the moving device on the basis of the information.

17. The solid-state imaging device according to claim 1, wherein the pixel array includes a first pixel and a second pixel, wherein the first pixel and the second pixel are arranged in different columns, wherein the first column circuit group includes a plurality of first column circuits, wherein the second column circuit group includes a plurality of second column circuits, wherein the first pixel is electrically connectable to at least one of the plurality of first column circuits, wherein the second pixel is electrically connectable to at least one of the plurality of second column circuits, and wherein said at least one of the plurality of first column circuits and said one at least one of the plurality of second column circuits are arranged in a same column.

18. The solid-state imaging device according to claim 1, wherein the first column circuit group is configured to process pixel signals for only a first color, and wherein the second column circuit group is configured to process pixel signals for only a second color.

19. The solid-state imaging device according to claim 9, wherein the pixel array includes a first pixel and a second pixel, wherein the first pixel and the second pixel are arranged in different columns, wherein the first column circuit group includes a plurality of first column circuits, wherein the second column circuit group includes a plurality of second column circuits, wherein the first pixel is electrically connectable to at least one of the plurality of first column circuits, wherein the second pixel is electrically connectable to at least one of the plurality of second column circuits, and wherein said at least one of the plurality of first column circuits and said at least one of the plurality of second column circuits are arranged in a same column.

20. The solid-state imaging device according to claim 10, wherein the pixel array includes a first pixel and a second pixel, wherein the first pixel and the second pixel are arranged in different columns, wherein the first column circuit group includes a plurality of first column circuits, wherein the second column circuit group includes a plurality of second column circuits, wherein the first pixel is electrically connectable to at least one of the plurality of first column circuits, wherein the second pixel is electrically connectable to at least one of the plurality of second column circuits, and wherein said at least one of the plurality of first column circuits and said at least one of the plurality of second column circuits are arranged in a same column.

* * * * *